(12) United States Patent  
Roytman

(10) Patent No.: US 6,273,724 B1
(45) Date of Patent: Aug. 14, 2001

(54) ARCHITECTURE FOR AUTONOMOUS AGENTS IN A SIMULATOR

(75) Inventor: Sergej Roytman, West Bloomfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/436,854

(22) Filed: Nov. 9, 1999

(51) Int. Cl.$^7$ ...................................................... G09B 9/04
(52) U.S. Cl. .................................. 434/69; 434/29; 434/65; 463/6
(58) Field of Search ................................. 434/29, 30, 45, 434/60–69, 71, 307 R, 308, 365, 373; 463/6, 7, 35–40, 23, 31; 345/4, 145; 348/121, 208; 273/148 B, 442, 654, 440; 701/2; 703/7, 8

(56) References Cited

U.S. PATENT DOCUMENTS

| | | |
|---|---|---|
| 4,846,686 | 7/1989 | Adams . |
| 5,299,810 | 4/1994 | Pierce et al. . |
| 5,354,202 * | 10/1994 | Moncrief et al. ....................... 434/69 |
| 5,366,376 * | 11/1994 | Copperman et al. .................. 434/69 |
| 5,474,453 | 12/1995 | Copperman . |
| 5,516,295 | 5/1996 | Stove . |
| 5,550,742 | 8/1996 | Furuya et al. . |
| 5,583,526 | 12/1996 | Socks et al. . |
| 5,660,547 | 8/1997 | Copperman . |
| 5,707,237 * | 1/1998 | Takemoto et al. ..................... 434/69 |
| 5,767,843 | 6/1998 | Wagner et al. . |
| 5,803,202 | 9/1998 | Bohner et al. . |
| 5,816,913 | 10/1998 | Nakamura . |
| 5,830,202 | 11/1998 | Bogdanski et al. . |
| 5,831,584 | 11/1998 | Socks et al. . |
| 5,865,624 * | 2/1999 | Hayashigawa ........................ 434/66 |
| 5,919,045 | 7/1999 | Tagge et al. . |
| 5,921,780 * | 7/1999 | Myers .................................... 434/69 |
| 6,171,186 * | 1/2001 | Kurosawa et al. ..................... 463/31 |

* cited by examiner

Primary Examiner—Joe H. Cheng
(74) Attorney, Agent, or Firm—Mark P. Calcaterra

(57) ABSTRACT

A simulator system including a first agent, at least one second agent and a position server. The first agent represents a first simulated body and each of the second agents represent second simulated bodies. The first agent includes position and orientation information of the first simulated body and is adapted to update the position and orientation information of the first simulated body based on a first set of predetermined control routines and to produce a first output signal indicative thereof. Each of the second agents calculate and recalculate position and orientation information of a respective second simulated body and are adapted to update the position and orientation information of the respective second simulated body based on a predetermined set of control routines and to produce a second output signal indicative thereof. The position server is operable for accepting each of the first and second output signals and in response thereto, updating the position and orientation information of the first agent and the at least one second agent. The position server produces a position signal indicative of the position and orientation of the first agent and the at least one second agent wherein at least a first portion of the position signal is communicated to the first agent to provide the first agent with the updated position and orientation information of each of the second simulated bodies and at least a second portion of the position signal is communicated to the at least one second agent to provide the at least one second agent with updated position and orientation information of the first simulated body.

19 Claims, 1 Drawing Sheet

ARCHITECTURE FOR AUTONOMOUS AGENTS IN A SIMULATOR

BACKGROUND OF THE INVENTION

1. Technical Field

The present invention relates generally to simulation systems and more particularly to a modular system architecture for controlling and monitoring a plurality of simulated vehicles.

2. Discussion

Many industries, particularly the automotive industry, rely on data obtained from simulation systems to reduce cycle times for designing products as well as design and development costs. In the context of automotive design, simulation systems are frequently employed to provide a vehicle manufacturer with data on numerous vehicle configurations, permitting the vehicle manufacturer to select a given design without expending the cost and time associated with the development of prototype components.

Despite the advantages of the prior art systems, several drawbacks have been noted. In particular, the architecture of many of these systems is rather rigid, rendering it extremely difficult to adapt the system to a requisite degree of complexity. For example, several simulation systems are based on relatively simple criteria which typically permit the behavior of a simulated body, particularly those that are not directly controlled by a human, to be developed with minimal programming effort. While such systems are particularly useful when narrowing a large field of options, their utility substantially diminishes when more detailed information is required. In many of these systems, more detailed information is simply not available unless significant programming and hardware changes are implemented to simulate more complex behavior.

On the other hand, several simulation systems are based on relatively complex sets of parameters, including behavior, which require a great deal of effort to accurately develop. While such systems are particularly useful to develop detailed information on a desired option, the utility of these systems substantially diminishes when less complex information is needed on a larger number of options.

SUMMARY OF THE INVENTION

It is therefore one aspect of the present invention to provide a simulator system having a flexible architecture which can be easily modified in a modular manner to permit simulations of varying complexity to be performed.

It is another aspect of the present invention to provide a simulator system which utilizes at least one modular agent for controlling the position and orientation of a simulated body.

It is a further aspect of the present invention to provide a simulator system which includes one or more autonomous agents for exhibiting one or more desired behaviors.

A simulator system having a flexible architecture which can be easily modified in a modular manner to permit simulations of varying complexity to be performed is herein provided. The simulator system includes a first agent, at least one second agent and a position server. The first agent represents a first simulated body and each of the second agents represent second simulated bodies. The first agent includes position and orientation information of the first simulated body and is adapted to update the position and orientation information of the first simulated body based on a first set of predetermined control routines and produce a first output signal indicative thereof. Each of the second agents includes position and orientation information of a respective second simulated body. Each second agent is adapted to update the position and orientation information of the respective second simulated body based on a predetermined set of control routines and produce a second output signal indicative thereof. The position server is operable for accepting the first output signal and each of the second output signals and in response thereto updating the position and orientation information of the first agent and the at least one second agent and producing a position signal indicative of the position and orientation of the first agent and the at least one second agent wherein at least a first portion of the position signal is communicated to the first agent to provide the first agent with the updated position and orientation information of the second simulated body and at least a second portion of the position signal is communicated to the at least one second agent to provide the at least one agent with updated position and orientation information of the first simulated body.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
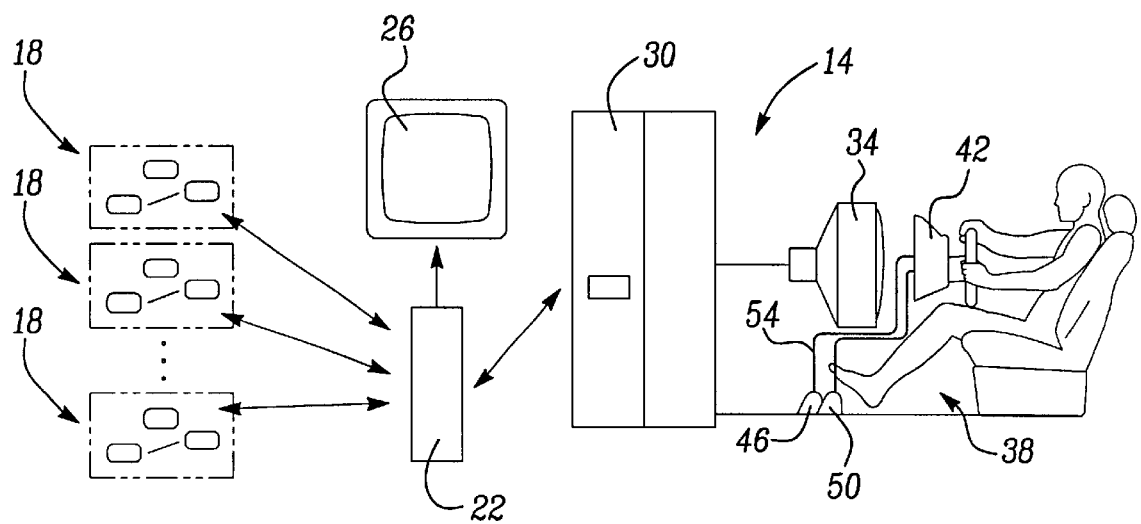
FIG. 1 is a schematic illustration of a simulator system constructed in accordance with the teachings of the present invention.

With reference to FIG. 1 of the drawings, a simulator system constructed in accordance with the teachings of the present invention is generally indicated by reference numeral 10. Simulator system 10 is shown to include a user agent 14, a plurality of simulated agents 18, a position server 22 and a monitoring terminal 26. In the particular embodiment illustrated, simulator system 10 is operable for simulating a vehicle and its operation in a virtual world which includes numerous environmental factors, including traffic. However, it will be understood that the teachings of the present invention have applicability to the simulation of other bodies and as such, will not be limited in scope to vehicle or traffic simulation devices.

The user agent 14 represents a simulated user vehicle and is operable for calculating and recalculating position and orientation information of the simulated user vehicle. The user agent 14 is adapted to update the position and orientation information of the simulated user vehicle based on a first set of predetermined control routines and produce a first output signal indicative thereof.

In the particular embodiment illustrated, the user agent 14 is illustrated to include a host machine 30, a video display 34 and a vehicle structure 38. The vehicle structure 38 includes a plurality of input devices, such as a steering wheel 42, a brake pedal 46, an accelerator pedal 50 and a gear shift selector 54, which receive an input from the user and convert these inputs into a user input signal which is communicated to the host machine 30. The host machine 30 is operable for receiving the user input signal and updating the position and orientation of the simulated user vehicle in accordance with the first set of predetermined control routines. In response thereto, host machine 30 produces the first output signal which is transmitted to the position server 22.

Host machine 30 also transmits the updated position and orientation information for the simulated user vehicle, as well as updated position and orientation information on the virtual environment, to the video display 34. Preferably, host machine 30 operates in real time so as to more accurately simulate a desired vehicle.

Video display 34 is situated such that the user may view the updated position and orientation information of the simulated user vehicle and the virtual environment to permit the user to determine a next course of action and provide the vehicle structure 38 with a new user input.

Each of the simulated agents 18 represents a simulated body, such as a simulated vehicle. Each of the second agents calculates and recalculates position and orientation information of a respective simulated body. Each second agent is adapted to update the position and orientation information of the respective simulated body based on a predetermined set of control routines and produce a second output signal indicative thereof.

Figure 2:
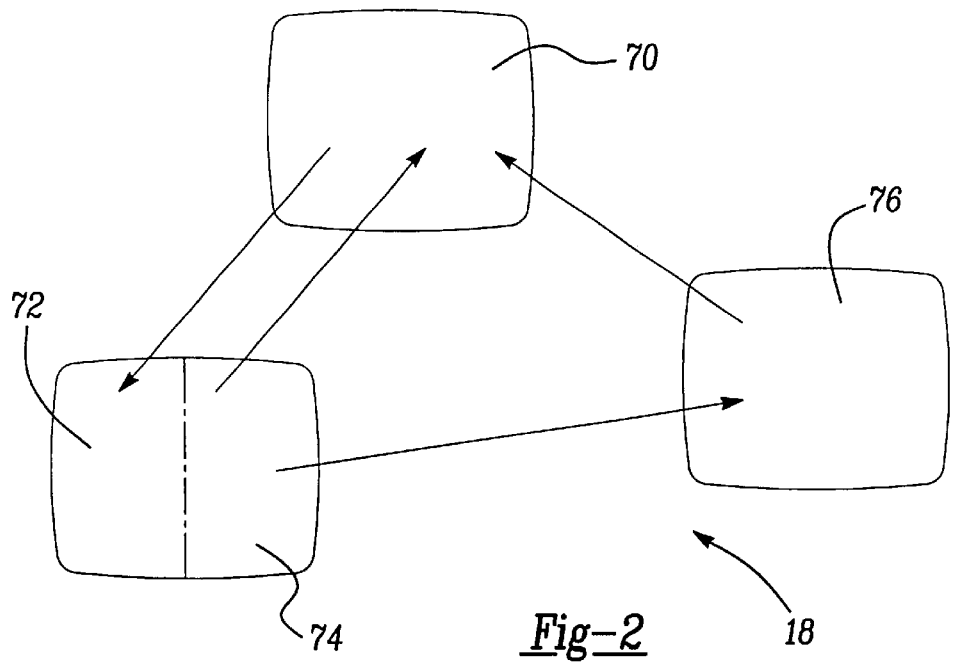
FIG. 2 is a schematic diagram of a portion of the simulator system of FIG. 1 illustrating one possible configuration of an agent.

With additional reference to FIG. 2, each of the simulated agents 18 is shown to include a high-level instruction module (HLIM) 70, a lower-level command module (LLCM) 72, a vehicle dynamics module (VDM) 74 and an input/output module (I/O module) 76. The HLIM 70 generates high-level instructions for planning the operation of the respective simulated body which are communicated to the LLCM 72. The HLIM 70 essentially simulates the thought process of a human driver. Examples of high-level instructions include instructions which cause the simulated body to change lanes and comply with a change in traffic regulations (e.g., speed limits, stop lights).

Occasionally, the high-level instructions provided to the LLCM 72 may conflict with one another to some degree. For example, the HLIM 70 may generate a first instruction to cause the simulated body to maintain a desired path around a curve and subsequently generate a second instruction to cause the simulated body to change lanes. The LLCM 72 is operable for resolving these conflicts by arbitrating between the instructions provided by the HLIM 70 and determining one or more tasks appropriate for controlling the simulated body. These tasks are then sent to the VDM 74. In this regard, the LLCM 72 simulates the mechanical output of a human driver to the vehicle controls. In the scenario mentioned above, the LLCM 72 would preferably generate a series of tasks to cause the simulated body to first change lanes and then to maintain a path in the new lane parallel to the previously desired path. It is important to note that the LLCM 72 may also destructively override instructions, in addition to masking lower-priority instructions while a higher-priority instruction is active.

The VDM 74 is operable for calculating and recalculating the current information and orientation information for the respective simulated body. Depending upon the particular task or tasks provided by the LLCM 72, the VDM 74 is operable for maintaining or changing one or more of the operating characteristics of the simulated body to generate updated position and orientation information of the simulated body. The VDM 74 subsequently provides feedback on the updated position and orientation information to the HLIM 70, as well as to the I/O module 76. In the particular embodiment illustrated, the feedback provided by the VDM 74 is in the form of variables and raw values. A first portion of the information provided by the VDM 74 consists of mechanical information of the vehicle, such as its position (x,y,z coordinates, pitch, roll, yaw) and sideways acceleration. Similarly, the I/O module 76 provides the HLIM 70 with the current position and closing rate for other vehicles in system 10 which has been received from the position server 22. After receiving this information, the HLIM 70 employs the road database (which is also used by the VDM 74) to place the information provided by the VDM 74 and I/O module 76 into a context wherein all of the available information can be used to make decisions for controling the vehicle.

The I/O module 76 communicates the updated position and orientation information to the position server 22 through a standardized protocol. The I/O module 76 insulates the VDM 74, the LLCM 72 and the HLIM 70 from a slowed exchange of information from the position server 22, as well as permits the simulator system 10 to gather all of the position and location information from each of the agents in one place, making it easy to modify the simulator system 10 if changes to the network interface are necessary.

The VDM 74 preferably runs in real-time or near real-time. At certain intervals, the VDM 74 sends an update to the I/O module 76 and the HLIM 70. When the timing of the execution of either the I/O module 76 or the HLIM 70 must be regulated, they are made to wait for an input from the VDM 74 which may be implemented for instance, by blocking in a Unix environment. As such, the VDM 74 provides the heartbeat of the simulated agent 18. As the LLCM 72 also preferably runs in real-time or near real-time, the VDM 74 and the LLCM 72 may be combined to share assets, such as the VDM clock.

As the user agent 14 and each of the simulated agents 18 are networked to the position server 22, the position server 22 is able to track the updated position and orientation information of all of the agents (e.g., user agent 14 and simulated agents 18) in simulation system 10 and generate a position signal indicative of the position and orientation of the user agent 14 and each of the simulated agents 18. Relevant information is then communicated to the user agent 14 and each of the simulated agents 18 to permit each of the agents in simulation system 10 to know the updated position and orientation of all of the other agents. In order to minimize the information that is communicated to each of the agents, position server 22 preferably does not transmit information to a particular agent that the particular agent had previously transmitted to the position server 22. In this regard, each agent is transmitted only a portion of the position signal wherein that portion includes only information pertaining to the other agents in simulator system 10.

The position signal, or portion thereof, transmitted to a simulated agent 18 is received by the I/O module 76. I/O module 76 then passes the data to the HLIM 70 for further analysis. Similarly, the position signal, or portion thereof, transmitted to the user agent 14 is received by the host machine 30 for further analysis or display onto video display 34. This arrangement, therefore, permits each agent to know the current and updated position and orientation of each of the other agents in simulator system 10. This arrangement also permits any number of computers to run any number of agents (user-agents or simulated agents), as well as to permit one or more of them to dynamically enter and/or leave system 10 at any predetermined or arbitrary time as desired.

The modular configuration of each of the simulated agents 18 provides the simulator system 10 with high degree of flexibility in that a simulated agent 18 may be readily tailored to an appropriate degree of complexity and/or biased in a desired manner without impacting the function and/or performance of other simulated agents 18, the user agent 14 or the position server 22.

One example of the flexibility provided by the modular architecture of simulator system 10 concerns the manner in which the HLIM 70 may be programmed. The HLIM 70 may perform on a very basic level wherein a series of instructions are generated according to a predetermined scripted schedule. Operation in this manner permits the HLIM 70 to operate while consuming very little computational resources. Accordingly, configuration in this manner would be especially useful where a large number of simulated agents 18 existed on a single computer.

If the behavior of one or more of the simulated agents 18 was not sufficiently complex, the HLIM 70 may be controlled with a finite state machine which generates a series of instructions based on the state of various inputs that are directed to the HLIM 70 of a respective simulated agent 18. Such inputs may relate to the operation, position or orientation of the respective simulated agent 18, or to other simulated agents 18, the user agent 14 or other environmental factors (e.g., encountering a slippery road surface). If further complexity is desired, the HLIM 70 may be programmed according to a Markov algorithm which utilizes probabilities and the state of various inputs directed to the HLIM 70 to determine a schedule of instructions.

If even more complexity is required, the HLIM 70 may be programmed with computer software that simulates the decision making processes of a human (i.e., simulates rational thought). The Soar cognitive architecture developed by John Laird and Allen Newell is particularly useful for programming the HLIM 70 to operate with this latter degree of complexity, enabling the HLIM 70 to try out possible plans without affecting the simulated agent 18, thus permitting the HLIM 70 to develop a series of instructions that closely simulate human operation. Operation of the HLIM 70 in this manner tends to consume substantial computational resources, which may necessitate the use of several computers where multiple simulated agents 18 of this complexity are desired.

The VDM 74 and LLCM 72 may also be tailored in a desired manner. For example, the VDM 74 may be programmed to simulate a "basic" vehicle comprising a pair of wheels which are spaced apart axially along the length of a rigid beam. Alternatively, the VDM 74 may be programmed to simulate a more advanced vehicle having four wheels and exhibiting characteristics more similar to those of a modern automotive vehicle.

Due to the flexibility of the modular architecture of the simulated agents 18, all of the simulated agents 18 in simulator system 10 need not be identical. For example, some of the simulated agents 18 may operate with a HLIM 70 programmed with Soar, while others may utilize a HLIM 70 which utilizes a predetermined script of instructions. This arrangement would considerably reduce the computational resources necessary to perform the simulation. This arrangement would also eliminate the possibility of obtaining unrealistic data that results from overly-smart agents that cause their simulated vehicles to behave wildly (e.g., weaving in and out of traffic to make faster progress).

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

I claim:

1. A simulation system comprising:

a first agent representing a first simulated body, the first agent including position and orientation information of the first simulated body, the first agent configured to update the position and orientation information of the first simulated body based on a first set of predetermined control routines and produce a first output signal indicative thereof;

at least one second agent, each second agent representing a respective second simulated body, each second agent including position and orientation information of the respective second simulated body, each second agent configured to update the position and orientation information of the respective second simulated body based on a predetermined set of control routines and produce a second output signal indicative thereof; and a position server for accepting the first output signal and each of the second output signals and in response thereto updating the position and orientation information of the first simulated body and each second simulated body and producing a position signal indicative of the position and orientation of the first simulated body and each second simulated body;

wherein at least a first portion of the position signal is communicated to the first agent to provide the first agent with the updated position and orientation information of each second simulated body and at least a second portion of the position signal is communicated to the at least one second agent to provide the at least one second agent with updated position and orientation information of the first simulated body.

2. The simulator system of claim 1, wherein the first agent is a user agent representing a simulated user body wherein the position and orientation information is updated based on a user input.

3. The simulator system of claim 1, wherein the first and second simulated bodies are first and second simulated vehicles, respectively.

4. The simulator system of claim 3, wherein each of the second agents includes a high level instruction module, a lower-level command module, a vehicle dynamics module and an input/output module, the high level instruction module generating high-level instructions for planning the operation of the second simulated vehicle, the lower level command module receiving the highlevel instructions and determining at least one task appropriate for controlling the second simulated vehicle, the vehicle dynamics module receiving the at least one task and calculating an updated position and orientation information of the second simulated vehicle, the input/output module receiving the updated position and orientation information of the second simulated vehicle and generating the second output signal in response thereto.

5. The simulator system of claim 4, wherein the high-level instruction module generates a series of instructions according to a scripted schedule.

6. The simulator system of claim 4, wherein the high-level instruction module generates a series of instructions according to a Markov algorithm.

7. The simulator system of claim 4, wherein the high level instruction module generates a series of instructions according to a predetermined algorithm and an input state received by the second agent.

8. The simulator system of claim 4, wherein the high-level instruction module generates a series of instructions according to a computer program which simulates rational thought.

9. The simulator system of claim 8, wherein the computer program is Soar.

10. A computer-based driving and traffic simulator, comprising:
- at least one simulated agent representing a simulated vehicle, each simulated agent including position and orientation information of a respective simulated vehicle, the at least one simulated agent configured to update the position and orientation information of its respective simulated vehicle based on a set of predetermined control routines;
- at least one user agent representing a user vehicle, each user agent including position and orientation information of a respective user vehicle, the position and orientation information of a respective user vehicle being updated based on a user input;
- a host for accepting user input for a respective user vehicle and responsively updating the position and orientation information of the respective user vehicle; and
- a position server coupled to the host and the at least one simulated agent and being configured to maintain a database of the position and orientation information of the at least one simulated vehicle, and disseminating position and orientation information to the at least one user agent and the at least one simulated agent.

11. The computer-based driving and traffic simulator of claim 10, wherein the set of predetermined control routines includes a set of control routines for simulating vehicle dynamics.

12. The computer-based driving and traffic simulator of claim 10, wherein the set of predetermined control routines includes a set of control routines for simulating low-level control actions.

13. The computer-based driving and traffic simulator of claim 10, wherein the set of predetermined control routines includes a set of control routines for simulating high-level control instructions.

14. A simulation system comprising:
- a user agent representing a user vehicle, the user agent including position and orientation information of the user vehicle, the user agent adapted to update the position and orientation information of the user vehicle based on a user input, the user agent producing a user output signal indicative thereof;
- at least one second agent, each second agent representing a respective second simulated vehicle and including position and orientation information of the respective second simulated vehicle, each second agent adapted to update the position and orientation information of the respective second simulated vehicle based on a predetermined set of control routines and produce a second output signal indicative thereof, each of the second agents including a high level instruction module, a lower-level command module, a vehicle dynamics module and an input/output module, the high level instruction module generating high-level instructions for planning the operation of the respective second simulated vehicle, the lower level command module receiving the high-level instructions and determining at least one task appropriate for controlling the respective second simulated vehicle, the vehicle dynamics module receiving the at least one task and calculating an updated position and orientation information of the respective second simulated vehicle, the input/output module receiving the updated position and orientation information of the respective second simulated vehicle and generating the second output signal in response thereto, and
- a host for accepting the first output signal and each of the second output signals and in response thereto updating the position and orientation information of the user vehicle and the second simulated vehicles and producing a position signal indicative of the position and orientation of the user vehicle and the second simulated vehicles;
- wherein at least a first portion of the position signal is communicated to the user agent to provide the user agent with the updated position and orientation information for each of the second simulated vehicles and at least a second portion of the position signal is communicated to the at least one second agent to provide the at least one second agent with updated position and orientation information of the first simulated vehicle.

15. The simulator system of claim 14, wherein the high-level instruction module generates a series of instructions according to a scripted schedule.

16. The simulator system of claim 14, wherein the high-level instruction module generates a series of instructions according to a Markov algorithm.

17. The simulator system of claim 14, wherein the high level instruction module generates a series of instructions according to a predetermined algorithm and an input state received by the second agent.

18. The simulator system of claim 14, wherein the high-level instruction module generates a series of instructions according to a computer program which simulates rational thought.

19. The simulator system of claim 18, wherein the computer program is Soar.

* * * * *